US011356125B2

(12) United States Patent
Tangudu et al.

(10) Patent No.: US 11,356,125 B2
(45) Date of Patent: Jun. 7, 2022

(54) DUAL-BAND AGC FOR RF SAMPLING RECEIVERS

(71) Applicant: Texas Instruments Incorporated, Dallas, TX (US)

(72) Inventors: Jawaharlal Tangudu, Bangalore (IN); Yeswanth Guntupalli, Andhra Pradesh (IN); Kalyan Gudipati, Bangalore (IN); Robert Clair Keller, Friedrichshafen (DE); Wenjing Lu, Shanghai (CN); Jaiganesh Balakrishnan, Bangalore (IN); Harsh Garg, Delhi (IN); Bragadeesh S, Tamil Nadu (IN); Raju Kharataram Chaudhari, Pune (IN); Francesco Dantoni, Rome (IT)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/953,947

(22) Filed: Nov. 20, 2020

(65) Prior Publication Data

US 2021/0159924 A1   May 27, 2021

Related U.S. Application Data

(60) Provisional application No. 62/939,007, filed on Nov. 22, 2019.

(51) Int. Cl.
*H04B 1/04* (2006.01)
*H04B 1/00* (2006.01)

(52) U.S. Cl.
CPC .......... *H04B 1/001* (2013.01); *H04B 1/0057* (2013.01); *H04B 1/04* (2013.01); *H04B 2001/0416* (2013.01)

(58) Field of Classification Search
CPC .......... H03F 1/0244; H03F 3/19; H03G 3/30; H03G 3/3042; H03G 3/3078; H03M 1/00; H03M 1/66; H03M 1/002; H03M 1/181; H03M 3/00; H04B 1/00; H04B 1/04; H04B 1/10; H04B 1/16; H04B 1/40;
(Continued)

(56) References Cited

U.S. PATENT DOCUMENTS 9,264,280 B1* 2/2016 Waheed .................. H04L 27/22
2007/0086547 A1* 4/2007 Sobchak ............. H04L 27/3809
375/345

(Continued)

*Primary Examiner* — Shawkat M Ali
(74) *Attorney, Agent, or Firm* — John R. Pessetto; Charles A. Brill; Frank D. Cimino (57) ABSTRACT

An integrated circuit comprises an input, a digital step attenuator, an analog-to-digital converter, a first output, a second output, a first bandwidth filter, a first band attack detector, a first band decay detector, a second bandwidth filter, a second band attack detector, a second band decay detector, and an automatic gain control. The ADC is configured to output a digital signal including a first and a second frequency range. The first and second bandwidth filters are configured to extract respective digital signals comprising the first and second frequency ranges. The band attack and decay detectors are configured to detect band peaks or decays thereof such that the DSA and External AMP may be controlled by means of the AGC based on the detected band peaks or decays, and ADC attack and ADC decay.

21 Claims, 6 Drawing Sheets

(58) Field of Classification Search
CPC ...... H04B 1/001; H04B 1/0057; H04B 17/00; H04B 17/318; H04L 27/00; H04L 27/06; H04L 27/08; H04L 27/28; H04L 29/06; H04L 63/1466
USPC ........ 375/260, 262, 267, 340, 345; 455/130, 455/207, 226.1, 230, 234.1, 334
See application file for complete search history.

(56) References Cited

U.S. PATENT DOCUMENTS

| | | | |
|---|---|---|---|
| 2017/0346461 A1* | 11/2017 | Corbishley | H03G 3/3078 |
| 2018/0183475 A1* | 6/2018 | Joish | H04B 1/16 |
| 2020/0021374 A1* | 1/2020 | de Ruijter | H04L 63/1466 |

* cited by examiner

DUAL-BAND AGC FOR RF SAMPLING RECEIVERS

CROSS-REFERENCE TO RELATED APPLICATIONS

This application claims priority to and the benefit of U.S. Provisional Application No. 62/939,007, filed Nov. 22, 2019, which is incorporated herein in its entirety.

FIELD

A dual-band automatic gain control for radio frequency sampling receivers is provided.

BACKGROUND

Radio frequency (RF) sampling receivers are widely used in base station transceivers. One significant advantage of it is the flexibility in supporting multiple bands with a single analog-to-digital converter (ADC) and multiple digital-down-convertor (DDC) chains. Since it is RF sampling architecture, the ADC is prone to saturation because of multiple out-of-band (sometimes even in-band) strong signals. Such strong signals may also be called interferences, blockers, or high-amplitude signals like peaks and dips, both types generally representing local extrema. This necessitates a gain control in the receive signal chain prior to the ADC so that the strong signals can be suppressed such that the ADC is prevented from saturating.

However, in case of dual-band RF sampling receivers, strong signals can come from any of the two bands and prior art solutions impact the performance of both the bands independent of where the specific strong signal resides.

SUMMARY

An integrated circuit is provided. The integrated circuit can be suitable for a sampling receiver. The sampling receiver can be configured to sample at radio frequency (RF).

The integrated circuit can comprise at least one of an input (IN), a digital step attenuator (DSA), an analog-to-digital converter (ADC), a first output (OUT), a second output, a first bandwidth filter (BWF), a first band attack detector, a first band decay detector, a second BWF, a second band attack detector, a second band decay detector, and an automatic gain control (AGC).

The integrated circuit can receive an analog input signal at the input. The input can be coupled to the DSA at an input side thereof. The DSA can be coupled to the ADC at an input side thereof.

The ADC can be configured to output a digital signal at a digital output of the ADC. The digital signal can have an overall frequency range including a first frequency range according to a first band and a second frequency range according to a second band.

The digital signal output by the ADC can be applied to an input of a first digital mixer and decimation filter (digital down converter; DDC) and an input of a second digital decimation filter (DDC). The first DDC may be configured to extract from the digital signal a first signal associated with the first frequency range according to the first band. The second DDC may be configured to extract from the digital signal a second signal associated with the second frequency range according to the second band.

The first signal output by the first DDC may be applied to the first BWF. In addition, a first output signal of the integrated circuit provided at the first OUT may be based on the first signal output by the first DDC. The second signal output by the second DDC may be applied to the second BWF. In addition, a second output signal of the integrated circuit provided at the second OUT may be based on the second signal output by the second DDC.

The integrated circuit may comprise a first plurality of DDCs applied to the first signal output by the first DDC. The integrated circuit may also comprise a second plurality of DDCs applied to the second signal output by the second DDC. In this case, the first output signal of the integrated circuit may be provided at an output side of the first plurality of DDCs. The second output signal of the integrated circuit may then be provided at an output side of the second plurality of DDCs.

The first BWF can be configured to extract a digital signal having the first frequency range. The first BWF can also be directly coupled to the output of the first mixer omitting the first DDC. Similarly, the second BWF can be configured to extract a digital signal having the second frequency range. The second BWF can also be directly coupled to the output of the second mixer omitting the second DDC.

The first band attack detector and the first band decay detector may be coupled to an output of the first BWF. At least one of the first band attack detector and the first band decay detector may be configured to detect a band peak (also called a strong signal, interference, or a blocker) or a decay thereof associated with the first frequency range. At least one of the first band attack detector and band decay detector may be configured to provide at least a first band attack indicator or a respective first band decay indicator to the AGC. The first band attack indicator can be based on the detection of the band peak greater than a threshold or band peak attack associated with the first frequency range. The first band decay indicator can be based on the detection of a decay of a band peak associated with the first frequency range.

Similarly, the second band attack detector and the second band decay detector may be coupled to an output of the second BWF. At least one of the second band attack detector and the second band decay detector may be configured to detect a band peak or a decay thereof associated with the second frequency range. At least one of the second band attack detector and band decay detector may be configured to provide at least a second band attack indicator or a respective second band decay indicator to the AGC. The second band attack indicator can be based on the detection of the band peak associated with the second frequency range. The second band decay indicator can be based on the detection of a decay of a band peak associated with the second frequency range.

The first BWF, the first band attack detector, and the first band decay detector can be independent of any of the second BWF, the second band attack detector, and the second band decay detector.

The so designed integrated circuit advantageously provides a novel approach to control the gain in the receiver chain prior to the ADC based on detection mechanisms of strong signals such as local extrema or decays thereof applied by means of respective first and second attack and decay detectors at an output side of the ADC. The detection mechanisms can in particular be band-dependent (frequency-dependent). Accordingly, the performance of the gain prior to the ADC is high.

The analog input signal can be based on a first amplified analog input signal and a second amplified analog input signal. The first amplified analog input signal can be amplified by means of a first amplifier (AMP). The first amplifier can be external to the integrated circuit. The second amplified analog input signal can be amplified by means of a second amplifier. The second amplifier can be external to the integrated circuit. The first and second amplifiers can be low noise amplifiers (LNAs). The first AMP and/or the second AMP can be arranged at an input side of the input of the integrated circuit and, thus, can both be external amplifiers. The AGC can be configured to control the first AMP and/or the second AMP independent of each other. The AGC can also be configured to control the first amplifier and/or the second amplifier based at least on the first and second band attack and decay detectors. In particular, the control mechanism of the AGC can be based on the first and second band attack and decay indicators. The control mechanism of the gain in the receiver chain prior to the ADC can thus be tailored by including the first and/or second AMPs, wherein the AMPs can be independently controlled on the band-dependent detection of band peaks or decays thereof.

The first and second AMPs may be coupled to an antenna configured to provide an analog input signal to the AMPs.

A band attack detector can be configured to detect a strong signal. A strong signal may be considered a local extremum of a band signal peak associated with the respective frequency range. This means, the first/second band attack detector can be configured to detect whether for a specific frequency or multiple frequencies associated with the first/second frequency range the peak level (amplitude) exceeds a predetermined (configurable) first/second band attack threshold value. A band attack detector can be configured to detect any strong signals with regard to the observed band. The total frequency range observed by a band attack detector associated with a specific BWF can be larger than the nominal pass band (bandwidth) of the band extracted by the corresponding DDC. Each band attack detector can be coupled to the AGC. The respective first/second band attack indicator provided to the AGC can indicate whether a band peak exceeding the first/second band attack threshold value is detected by the respective first/second band attack detector. In other words, the band attack detector associated with a respective BWF can operate as a trigger and can indicate the existence of a strong signal, which indication can be included in the control mechanism performed by the AGC. Accordingly, the gain in the receiver chain prior to the ADC is further adaptable by including first/second band attack detectors. The peak threshold value (band attack threshold value) at an BWF output can be computed such that it refers to a particular configurable peak level when referred back to an antenna at an input of the circuit or to the DSA input itself. So, the first/second band attack threshold values can be computed taking into account the current value of the DSA attenuation.

In particular, a band attack threshold value BandAttackTh_BWFOut_dB may be computed as: BandAttackTh_BWFOut_dB=BandAttackTh_DsaInput_dB+DsaGaindB, where BandAttackTh_DsaInput_dB refers to the peak level at the chip input, and wherein DsaGaindB refers to the attenuation (gain) of the DSA.

A band decay detector can be configured to detect a decay of a strong signal, which may be considered a decay of a local extremum of a band peak associated with the respective frequency range. This means that a band decay detector can be configured to detect whether for a specific frequency or multiple frequencies associated with the first/second frequency range the peak level (amplitude) goes below a predetermined (configurable) first/second band decay threshold value. The band decay detector can be configured to detect in-band and out-of-band decays of strong signals with regard to the observed band. This means that the total frequency range observed by a band decay detector associated with a specific BWF can be larger than the nominal pass band (bandwidth) of the band extracted by the corresponding DDC. The decay detector can be coupled to the AGC. The respective first/second band decay indicator provided to the AGC can indicate whether a band peak going below the first/second band decay threshold value is detected by the respective first/second band decay detector. In other words, a band decay detector can operate as a trigger and can indicate the existence of a decay of a strong signal, which indication can be included in the control mechanism performed by the AGC. Accordingly, the gain in the receiver chain prior to the ADC is further adaptable by including first/second band decay detectors. The first/second band decay threshold values at a respective BWF output can be computed such that they refer to a particular configurable peak level when referred back to the antenna or at the DSA input. So, a band decay threshold value at an BWF output can be computed after considering the current value of the DSA attenuation.

In particular, a band decay threshold value BandDecayTh_BWFOut_dB may be computed as: BandDecayTh_BWFOut_dB=BandDecayTh_DsaInput_dB+DsaGaindB, where BandDecayTh_DsaInput_dB refers to the peak level at the chip input, and wherein DsaGaindB refers to the attenuation (gain) of the DSA.

The first/second band attack threshold values can be larger than the first/second band decay threshold values. Both thresholds may also be equal to each other. If the first/second band attack threshold value is different from the first/second band decay threshold value a hysteresis can be included in the control mechanism performed by the AGC. Therefore, toggling between different control statuses is avoided.

As mentioned before, the first/second band attack/decay thresholds of the band decay and attack detectors can be dependent on the DSA gain setting. Therewith the attack/decay thresholds are related to an input of the DSA even though the detection mechanism of strong signals (peaks) or decays thereof are performed on the output side of the ADC, i.e. based on the digital part of the circuit. In an exemplary example, "0 dBFS" may represent the full scale of the ADC output in decibel notation. In this case, a band decay threshold in dBFS: "Th_dBFS" may be determined using the following equation: Th_dBFS=Th_dBFS_At_DSA_Zero+(CurrDsaGaindB−ZeroDSAGaindb), where "Th_dBFS_At_DSA0" is the threshold to be used when the DSA Index is zero corresponding to the largest DSA Gain. "CurrDsaGaindB" is the current (actual) DSA Gain in dB and "ZeroDSAGaindB" represents the gain when the DSA is at index zero. Based on the above equation the band attack/decay thresholds dynamically change based on the current DSA setting so that the threshold is affected by the signal level at the DSA input.

The integrated circuit can comprise a band power difference stage. The band power difference stage can be configured to compare a first band power of a signal provided at an output of the first BWF and a second band power of a signal provided at an output of the second BWF. The band power difference stage can also be configured to provide a difference indicator, wherein the difference indicator is based on the difference between the first band power and the second band power. The AGC can be configured to control the first AMP and the second AMP and/or the DSA based on the band power difference stage, in particular based on the difference indicator. As an example, the difference indicator can have a first value if the detected difference of the first and second band powers is below a predefined (configurable) difference threshold value in terms of an absolute value (difference indicator denoted as "BAND_POWERS_EQUAL"). The difference indicator can also have a second value if the difference between the first band power and the second band power has a positive value and exceeds the difference threshold value (difference indicator denoted as "FIRST_BAND_HIGH"). Moreover, the difference indicator can have a third value if the difference between the first band power and the second band power has a negative value and goes below the negative difference threshold value (difference indicator denoted as "SECOND_BAND_HIGH"). According to a specific example, the difference threshold value may be 20 db. Further, to provide hysteresis the threshold (e.g.: +20 dB) for transitioning from "BAND_POWERS_EQUAL" to "FIRST_BAND_HIGH" is different from the threshold (e.g.: +15 dB) for transitioning from "FIRST_BAND_HIGH" to "BAND_POWERS_EQUAL". Accordingly a hysteresis corresponding to 5 dB is provided. Similarly, for negative values a hysteresis for "SECOND_BAND_HIGH" may be provided. Example thresholds can be −20 dB and −15 dB. The band power difference stage can also be configured to include current and/or maximum gains of the AMPs when determining a band power difference of the power levels. Yet, the control mechanism applied by the AGC is further adaptable.

In an exemplary example, the power of the first band at an input side of the first AMP may be referred to as "FirstBandPowerAtAntenna". For including the current gains of the AMPs and the DSA when taking into account the power level detected at an output side of the first BWF, the following equation may be used: FirstBandPowerAtAntenna=FirstBandPowerDig−(CurrDsaGaindB−ZeroDSAgaindb)−CurrAmplifierGain, where "FirstBandPowerDig" is the power level at the output of the first BWF and "CurrAmplifierGain" is the current amplification factor provided by the first AMP of the first band. Similarly, "SecondBandPowerAtAntenna" may also be computed.

Accordingly, the AGC may be configured to control the first AMP and the second AMP and/or the DSA based on the antenna referred band powers ("First/SecondBandPowerAtAntenna") of the first and second band. When including the difference stage, the gain control mechanism of the AMPs and the DSA may in particular be based on the difference of the two antenna referred band powers where powers are denoted in decibels.

Furthermore, when including a band power difference stage, the first/second band attack/decay thresholds of the band attack/decay detectors may be adaptable depending on the detected band power difference by means of the difference stage, or depending on the difference indicator provided by the difference stage.

According to an exemplary example, if the band power difference indicator is in either the "FIRST_BAND_HIGH" or the "SECOND_BAND_HIGH" state, then lower thresholds may be used for the band attack/decay thresholds of the first/second band attack/decay detectors. If the band power difference indicator is in the "BAND_POWERS_EQUAL" state, then higher thresholds may be used for the band attack/decay thresholds of the first/second band attack/decay detectors. Lower thresholds for the band attack/decay detectors imply that at least one amplification stage of at least one AMP is bypassed/re-enabled at a lower peak level ensuring that the DSA is not solely used for attenuation. Higher thresholds for band attack/decay detectors imply that the DSA is used for attenuation until the band peak level at an extremum (strong signal) reaches the higher threshold. Only then, if the band power level at an extremum crosses the higher threshold, at least one amplification stage may be bypassed to avoid saturation of the ADC. The thresholds for band attack/decay detectors determine whether at least one amplification stage should be bypassed or the DSA gain should be reduced. In effect, the distribution of the gain in the gain chain prior to the ADC may thus be effectively adapted. In other words, the dynamic control of the band attack/decay thresholds based on the band power difference stage enables a dynamic partition of the gain distribution between the AMPs and the DSA. Further details on the mechanism of bypassing/re-enabling at least one amplification stage are provided below.

In another embodiment, the circuit the dynamic adaption of the thresholds may be based on the antenna referred band peak (extremum) difference instead of on the antenna referred band power difference. Also, a different metric other than power or peak could be used instead.

The integrated circuit can comprise at least one power level detection stage. In particular, one power level detection stage can be associated with each of the first BWF and the second BWF. The power level detection stage can be configured to detect a peak or power level of a signal provided at an output of a respective BWF. The power level stage can also be configured to provide a level indicator to the AGC. The AGC can be configured to control the first AMP and the second AMP and/or the DSA based on the level detection stage, in particular on the level indicator. The level indicator can indicate whether a peak or power level of a respective output signal of a BWF exceeds a predetermined (configurable) level detection threshold value. In particular, the control mechanism of the AGC can include level indicators for each of the output signals of the first and second BWFs. Accordingly, the control mechanism is further adaptable.

When including a power level detection stage, the first/second band attack/decay thresholds of the band attack/decay detectors may be adaptable depending on the detected peak or power level by means of the power level detection stage, or depending on the level indicator provided by the power level detection stage.

According to an exemplary embodiment, if the antenna referred band peak or power of the first band exceeds a (configurable) level detection threshold, the level indicator with regard to the first band may denote "FIRST_BAND_HIGH", else it may denote "FIRST_BAND_LOW". Similarly, the level indicator with regard to the second band may denote "SECOND_BAND_HIGH" or "SECOND_BAND_LOW" according to a similar mechanism including a second respective level detection threshold. Based on the first/second band level indicators, the first/second band attack/decay thresholds may be adaptable. For example, if the level indicators both are in a HIGH state, i.e. "FIRST_BAND_HIGH" and "SECOND_BAND_HIGH", then relatively high band attack/decay thresholds may be used. If the level indicators are in different states, i.e. "FIRST_BAND_HIGH" and "SECOND_BAND_LOW" or "FIRST_BAND_LOW" and "SECOND_BAND_HIGH", then relatively low band attack/decay thresholds may be used, in particular for the band for which the indicator denotes the HIGH state. If both indicators denote the LOW state, i.e. "FIRST_BAND_LOW" and "SECOND_BAND_LOW", then relatively high thresholds may be used for both bands. Furthermore, if the indicators denote similar states (both HIGH or both LOW), then the band attack/decay thresholds may rather be similar to each other. Accordingly, the AGC can thus be configured to dynamically control the AMPs and the DSA based on the level indicator signals from both bands. In general, band detector thresholds can be dynamically updated based on antenna referred band powers (or peaks) of both the bands.

According to a further aspect, at least one of the first and second BWF can be disabled. Accordingly, the signal output by the first and second DDCs may be used and directly provided to the band attack/decay detectors. In addition, these signals may also be used for the mechanisms of the band power difference stage and/or the level detection stages.

The integrated circuit can also comprise an ADC attack detector coupled to an output side of the ADC. The ADC attack detector can be configured to detect a peak or power level (amplitude) of the signal output by the ADC. The ADC attack detector can in particular detect whether the peak/power level exceeds a (configurable) ADC attack threshold value. The ADC attack threshold value can correspond to a value at which the ADC saturates. The ADC attack threshold value can be dependent on an amplification factor of the first and second AMPs and/or an attenuation factor of the DSA and/or a (maximum) accessible peak/power level range of the ADC. The ADC attack detector can also be configured to provide an ADC attack indicator to the AGC, wherein the ADC attack indicator is based on whether the peak/power level of the signal output by the ADC exceeds the ADC attack threshold value. Whenever the AGC receives an ADC attack indicator, it may attempt to increase the attenuation in the chain primarily by increasing the DSA attenuation. As a secondary measure, the AGC may also bypass at least one amplification stage of an AMP in one or both the bands if the DSA attenuation can no longer be increased although the ADC attack threshold value is exceeded.

The integrated circuit can also comprise an ADC decay detector coupled to an output side of the ADC. The ADC decay detector can be configured to detect whether a peak or power level (amplitude) of the signal output by the ADC goes below a (configurable) ADC decay threshold value. The ADC decay threshold value can correspond to a peak/power level which provides a minimum (acceptable) signal-to-noise ratio of the ADC. The ADC decay threshold value can be dependent on an amplification factor of the first and second AMPs and/or an attenuation factor of the DSA and/or a (minimum) accessible peak/power level range of the ADC. The ADC decay detector can also be configured to provide an ADC decay indicator to the AGC, wherein the ADC decay indicator is based on whether the peak/power level of the signal output by the ADC goes below the ADC decay threshold value. Whenever the AGC receives an ADC decay indicator, it may attempt to decrease the attenuation in the chain primarily by decreasing the DSA attenuation. As a secondary measure, the AGC may also re-enable at least one amplification stage of an AMP in one or both the bands along with adjusting the DSA attenuation appropriately as long as the ADC decay condition is triggered.

The ADC attack threshold value can be larger than the ADC decay threshold value. This ensures hysteresis in the AGC algorithm and in general contributes to the AGC stability.

The AGC can be configured to control the first AMP and the second AMP and/or the DSA based on the ADC attack indicator and the ADC decay indicator received from the ADC attack detector and the ADC decay detector.

If there are no strong signals (extrema) detected associated with regard to any of the respective frequency ranges, there should be minimal performance degradation. This is generally achieved by maintaining the AMPs and the DSA at the highest suitable gain. In case a (local) strong signal (extremum) or decay thereof is detected associated with regard to any of the respective frequency ranges, the performance degradation should be kept as low as possible for both the frequency bands. With the present integrated circuit this can be achieved by adjusting the AMPs and the DSA according to the highest possible gain which does not saturate the ADC. Accordingly, by dynamically adjusting the AMPs and the DSA on an independent basis the signal-to-noise ratio is advantageously improved independently for both the bands.

The (gain) control mechanism performed by the AGC can include that an attenuation of the analog input signal by means of the DSA is increased if a peak or power level of the signal output by the ADC is detected by means of the ADC attack detector to exceed the (configurable) ADC attack threshold value. If the attenuation by means of the DSA is increased, saturation of the ADC can be avoidable. In effect, the increased attenuation leads to degradation of the analog signal at an input side of the ADC. This makes the gain control mechanism adaptable based on the accessible power level range of the ADC.

There may be events in which increasing the attenuation by means of the DSA is insufficient to avoid saturation of the ADC or can cause unwanted large performance degradation to both the bands. Increasing the DSA attenuation impacts the performance of both the bands whereas bypassing an amplification stage of an AMP only impacts the performance of the specific band leaving the other band unaffected. Therefore, the (gain) control mechanism performed by the AGC can also be configured such that at least one amplification stage of at least one of the first AMP and the second AMP can be bypassed. Bypassing at least one amplification stage of at least one of the first AMP and the second AMP can in particular be performed if an attenuation of the analog input signal by means of the DSA reaches or exceeds a predetermined (configurable) DSA-LNA-BYPASS threshold value. The DSA-LNA-BYPASS threshold value can correspond to the maximum attenuation desirable by the DSA before bypassing an amplification stage. In other words, if the attenuation by means of the DSA reaches or exceeds the DSA-LNA-BYPASS threshold value, the attenuation by means of the DSA can be out of a desired performance regime of the DSA for one or both the bands, although the DSA operates at a rather high level. To avoid that the DSA reaches its intrinsic maximum attenuation state, at least one amplification stage can be bypassed. Bypassing at least one amplification stage can lead to a reduction of the amplification factor between 2 dB and 40 dB, preferably between 5 dB and 30 dB, more preferably between 9 dB and 18 dB. This means, if the available attenuation range provided by the DSA is not sufficient anymore for maintaining the desired performance for one or both the bands or avoiding saturation of the ADC, at least one amplification stage of at least one AMP can be bypassed. Accordingly, an additional measure is provided by bypassing an amplification stage of at least one AMP in one or both the bands to maintain a desired performance for both the bands and avoiding saturation of the ADC.

Bypassing an amplification stage of at least one AMP may lead to a rather drastic decrease of the amplitude of the analog input signal at the input side of the ADC. In this case, the peak or power level in most events will not even be close to saturation of the ADC anymore. In particular, bypassing at least one amplification stage may cause the signal-to-noise ratio of the ADC going below a desirable ratio in terms of an optimum performance regime of the ADC. To improve the signal-to-noise ratio again an additional measure may be based on decreasing the attenuation of the DSA again. Hence, the (gain) control mechanism performed by the AGC can be configured such that the attenuation of the analog input signal by means of the DSA is decreased in response to bypassing at least one amplification stage of at least one of the first AMP and the second AMP. Therefore, the signal-to-noise ratio may be adaptable.

The (gain) control mechanism performed by means of the AGC can also include that the attenuation of the analog input signal by means of the DSA is decreased if a peak/power level of the signal output by the ADC is detected by means of the ADC decay detector to go below the (configurable) ADC decay threshold value. By decreasing the attenuation applied by the DSA the peak/power level of the analog input signal to the ADC is increased such that an improved signal-to-noise ratio can be achievable for the ADC. Accordingly, the gain control mechanism is further adaptable.

If the attenuation by means of the DSA is further decreased it may be that the attenuation reaches or goes below a lower limit (DSA-DECAY-TH) of the desirable performance regime of the DSA. Accordingly, the (gain) control mechanism performed by the AGC can also be configured to activate (re-activate) at least one amplification stage of at least one of the first AMP and the second AMP if the attenuation of the analog input signal by means of the DSA reaches or goes below a predetermined (configurable) DSA-DECAY-TH threshold value. The DSA-DECAY-TH threshold value can correspond to the minimum attenuation desirable by the DSA. This means, that even though the attenuation by means of the DSA is low, the signal-to-noise ratio may be below a wanted parameter regime. Accordingly, at least one amplification stage of at least one of the first and second AMP can be activated. This control measure of the AGC may not be applicable if for the first or second or both of the first and second AMPs all amplification stages are in an active state. This means, this mechanism can depend on whether at least one amplification stage has been bypassed before. As a consequence, after having re-enabled at least one amplification stage, the peak/power level of the analog input signal may be significantly increased. The amplification factor can be increased between 2 dB and 40 dB, preferably between 5 dB and 30 dB, more preferably between 9 dB and 18 dB. Accordingly, a too small power level of the analog input signal can be avoided such that the signal-to-noise ratio is high.

The reactivation of at least one amplification stage may lead to a rather strong increase of the peak/power level of the analog input signal at the input side of the ADC. Consequently, the (re-)activation of an additional amplification stage may provide the possibility to increase the attenuation applied by the DSA again in order to keep the DSA at an optimum performance regime while simultaneously keeping the signal-to-noise ratio within a desirable range. This means, the gain control mechanism can also include that the attenuation of the analog input signal by means of the DSA is increased in response to activating one additional amplification stage for at least one of the first AMP and the second AMP.

The electronic device can also include at least one additional BWF coupled to at least one of the first AMP and the second AMP at an input side thereof. In particular at least one additional BWF can be applied at each input side of the first and second AMPs. The additional BWFs can be configured to extract a frequency range generally corresponding to the respective first and second bands from the analog input signal applied to the additional BWFs. The analog input signal can for example be provided by an antenna. The additional BWFs can be surface acoustic waves filters.

A pass band (an observation bandwidth) of at least one of the first BWF and the second BWF at the output side of the ADC can be configurable according to the needs. Furthermore, the pass band (observation bandwidth) of the first BWF and the second BWF at the output side of the ADC can be larger than a pass band (an external filter bandwidth) provided by the additional BWFs at the input sides of the first and second AMPs. In particular, the pass band (observation bandwidth) of the first BWF arranged at an output side of the ADC can be larger than a pass band (an external filter bandwidth) of an additional BWF arranged at an input side of the first AMP. Similar, the pass band (observation bandwidth) of the second BWF arranged at an output side of the ADC can be larger than a pass band (an external filter bandwidth) of an additional BWF arranged at an input side of the second AMP. Accordingly, the first/second band attack/decay detectors are configured to observe any strong signals (extrema) or decays thereof since the pass bands provided by the first/second BWFs is larger than the pass band (filter bandwidth) provided by the additional BWFs at the input side of the AMPs.

In other words, the bands observed by the first/second band attack/decay detectors may encompass the pass bands provided by the external BWFs at the input sides of the respective AMPs so that all strong signals (extrema) or decays thereof are within the accessible frequency ranges of the first/second band attack/decay detectors at the output side of the ADC. Thus, all strong signals (extrema) or decays thereof are detectable by means of the first/second band attack/decay detectors and not filtered out by the first/second BWFs at the output side of the ADC. Furthermore, the accessible frequency range of the first BWF at the output side of the ADC may be such that it does not overlap with the pass band provided by the additional BWF at the input side of the second AMP. Vice versa, the accessible frequency range of the second BWF at the output side of the ADC may be such that it does not overlap with the pass band provided by the additional BWF at the input side of the first AMP.

The output bandwidth of the respective bands output at the first OUT and the second OUT subsequent to the first and second pluralities of DDCs of the integrated circuit may be even narrower than the filter bandwidth of the external BWFs provided at the input sides of the AMPs.

Furthermore, an electronic device is provided. The electronic device can comprise an integrated circuit as previously described herein. The electronic device can comprise a first AMP and a second AMP. The first and second AMPs can be external to the integrated circuit and can be low noise amplifiers (LNAs). The analog input signal of the integrated circuit can be based on a first amplified analog input signal amplified by means of the first AMP and a second amplified analog input signal amplified by means of the second AMP, both AMPs arranged at an input side of the input of the integrated circuit. The AGC can be configured to control the first and second AMPs based at least on the first and second band attack and decay indicators provided by the respective first and second band attack and decay detectors as previously described. The AGC can control the first and second AMPs independent of each other. The AGC can also be configured to control the DSA based on the same indicators as described herein before.

The so designed electronic device provides an adaptable control mechanism for tailoring the gain in the receiver chain prior to the ADC based on the particular peak or power levels and strong signals (extrema) or decays thereof detected by means of the respective detection components at an output side of the ADC.

A corresponding method of operating the integrated circuit as herein described before is also provided.

The analog input signal can have frequencies within the range of 1 GHz to 100 Ghz, preferably within a range of 1.5 GHz and 50 GHz, more preferably below 20 GHz, more preferably below 10 GHz, more preferably between 1.8 GHz and 2.6 GHz. In particular, the first analog input signal can have frequencies according to a band centered at about 1.8 GHz. The second analog input signal can have frequencies according to a band centered at about 2.6 GHz.

The first and second pluralities of digital decimation filters can cause an attenuation of at least 5 dB and can comprise five single decimation filters, each configured to cause an attenuation of about 1 dB. The pluralities of decimation filters can also include at least 10 single filters, preferably, 15 single filters, more preferably 20 single filters, each configured to cause an attenuation of about 1 dB. In general, there could also be a known fixed attenuation between the ADC output and the first BWF output. This known attenuation can be offset in the first attack/decay threshold settings. Similarly, a known attenuation may be offset in the second attack/decay threshold settings.

The integrated circuit can also comprise additional outputs. Accordingly, the ADC can also be configured to output additional digital signals having additional frequency ranges at the additional outputs.

Any of the threshold values mentioned herein may be predetermined. However, they may also be configurable by means of the gain control mechanism performed by the AGC.

BRIEF DESCRIPTION OF DRAWINGS

Further aspects and characteristics will ensue from the following description of preferred embodiments with reference to the accompanying drawings, wherein.

DETAILED DESCRIPTION OF EMBODIMENTS

Figure 1:
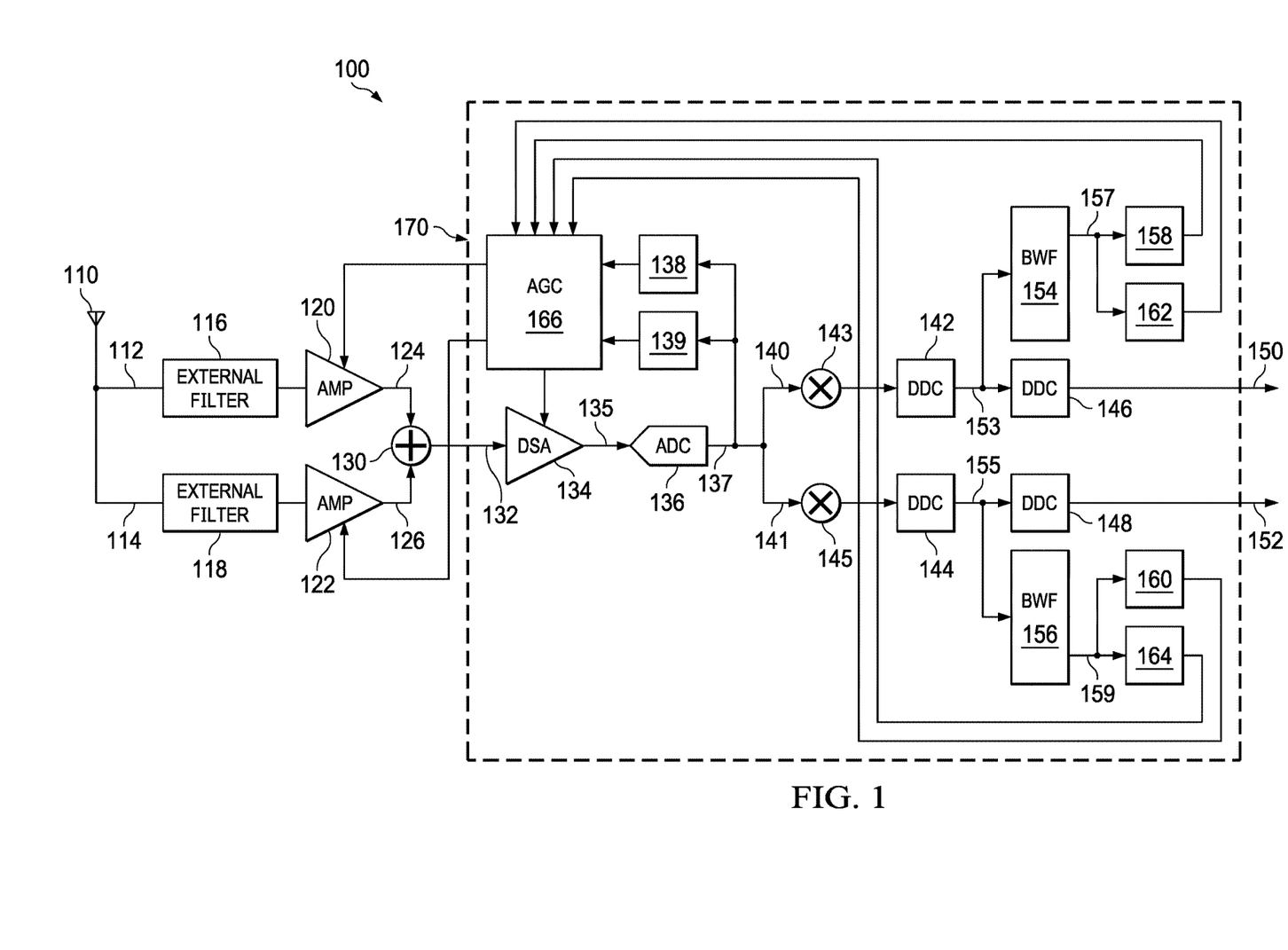
FIG. 1 is a schematic diagram of the electronic device.

FIG. 1 shows a simplified schematic diagram of the electronic device 100.

The electronic device comprises an antenna 110. The antenna 110 may be a multi-band antenna 110 configured to receive signals having multiple frequencies according to a first band 112 and a second band 114. In particular, the antenna 110 may be configured to receive signals at a first band 112 around 1.8 GHz and at a second band 114 around 2.6 GHz.

The antenna 110 is coupled to external BWFs 116, 118. The external BWFs 116, 118 may be surface acoustic wave (SAW) filters. The external BWFs 116, 118 have specific bandwidths and band centers, respectively. In effect, they represent two band pass filters.

The analog input signals according to the first band 112 and the second band 114 may subsequently be amplified by a first and a second amplifier 120, 122. The first/second AMPs 120, 122 may be low noise amplifiers (LNAs). The AMPs 120, 122 comprise multiple amplification stages such that the signal-to-noise ratio is improved by the amplification according to both amplifiers.

Afterwards, the analog input signals 124, 126 may be combined into a single analog input signal 132 by means of a combination element 130. The input signal 132 may then be fed into the DSA 134. The DSA 134 attenuates or increases the input signal 132 in order to provide an analog signal 135 with a suitable power level to the ADC 136.

The ADC 136 converts the analog input signal 135 and outputs a digital output signal 137. The digital output signal 137 may be subsequently split and similarly be applied according to a first branch 140 and a second branch 141 corresponding to first and second bands.

The digital output signal 137 of the ADC 136 may also be applied to an ADC attack detector 138 and an ADC decay detector 139. The ADC attack detector 138 may be configured to detect a peak or power level (amplitude) of the signal output by the ADC 136. The ADC attack detector 138 can in particular by triggered, if it detects that the peak or power level of the output signal 137 of the ADC 136 exceeds an ADC attack threshold value. The ADC attack threshold value can correspond to a value at which the ADC 136 saturates.

The ADC decay detector 139 may similarly be configured to detect whether a peak or power level (amplitude) of the signal 137 output by the ADC 136 goes below a ADC decay threshold value. In this case, the ADC decay detector 139 may be triggered. The ADC decay threshold value can correspond to a peak or power level which provides a minimum signal-to-noise ratio of the ADC 136.

The ADC attack/decay threshold values may be dependent on an amplification factor provided by means of the first and second AMPs 120, 122 and/or by an attenuation factor or gain provided by means of the DSA 134 and/or by an accessible peak or power level range of the ADC 136. The ADC attack/decay detectors 138, 139 can also be configured to provide an ADC attack/decay indicator to the AGC 166, wherein the ADC attack/decay indicator is based on whether the peak or power level of the signal 137 output by the ADC 136 exceeds/goes below the ADC attack/decay threshold values.

Subsequently, the output signal 137 may be applied according to the first branch 140 and the second branch 141 to a first digital mixer 143 and a second digital mixer 145. The first digital mixer output and second digital mixer output are connected to DDC 142 and a second DDC 144. The first DDC 142 and the second DDC 144 can be configured to extract from the digital output signal 137 of the ADC 136 a first/second signal associated with the first/second frequency ranges according to the first/second bands.

The first/second digital mixer frequencies of the first/second DDCs 142, 144 can be at the center of the first/second bands.

Subsequent to the first DDC 142, a first plurality of additional DDCs 146 can be coupled. Similarly, at the output side of the second DDC 144, a second plurality of DDCs 148 can be coupled. Although not shown in detail, each plurality of DDCs 146, 148 can comprise multiple stages of decimation filters or DDCs, preferably 20 DDCs. Subsequent to the respective plurality of DDCs 142, 146, 144, 148, a first digital signal and a second digital signal may be applied to a first output 150 and a second output 152 of the electronic device 100.

The output signals of the first and second branches 140, 141 output by the first and second DDCs 142, 144 may be applied to BWFs 154, 156. The BWFs 154, 156 may be configured to provide suitable digital signals at the band detector inputs 157, 159 according to the first and second bands for the first and second band attack/decay detectors 158, 160, 162, 164.

A first band attack detector 158 and a first band decay detector 162 may be coupled at the band detector input 157 to the signal of the first band subsequent to the first BWF 154.

A second band attack detector 160 and a second band decay detector 164 may be coupled at the band detector input 159 to the signal of the second band subsequent to the second BWF 156.

In effect, the band attack/decay detectors 158, 160, 162, 164 may evaluate the respective signal subsequent to the first DDCs 142, 144 of the pluralities of DDCs. Since each DDC causes a reduction of the bandwidth and the sampling rate, therefore, the band detectors 158, 160, 162, 164 may observe the respective signals with regard to their peak or power levels across a larger bandwidth as compared to the case in which the band detectors 158, 160, 162, 164 would be coupled at an output side of the first/second pluralities of DDCs, 146, 148. In addition, the bandwidth of the digital signal of both branches 140, 141 is reduced by applying further DDCs. Hence, the observable bandwidth of the digital signals detected by the band detectors 158, 160, 162, 164 is larger if the detectors 158, 160, 162, 164 are coupled to the output of the respective first DDCs 142, 144 of each branch 140, 141.

Each of the band attack detectors 158, 160 may be configured to detect a strong/peak signal within the observed digital signal. The strong signal may be in-band or out-of-band. In this regard, signals having a frequency which is within the bandwidth provided by the first BWF 116 at the input side of the first AMP 120 are detected by band attack detector 158. Since the observable pass band of the first/second band attack detectors 158, 160 is larger than the pass band provided by the first/second BWFs 116, 118 at the input side of the first/second AMPs 120, 122, the first/second band attack detectors 158, 160 may also be configured to detect strong signals at frequencies outside the respective external filter pass bands. These strong signals may be referred to as out-of-band strong signals. A band attack detector 158, 160 is triggered if a peak or power level of the observed digital signal for a specific frequency exceeds a respective first/second band attack threshold value. Each of the band attack detectors 158, 160 may be configured to output a first/second band attack indicator to the AGC 166 indicating the detection of a strong signals by means of the respective band attack detector 158, 160.

Each of the band decay detectors 162, 164 may be configured to detect a decay of a strong/peak signal within the observed bandwidth of the respective digital signal. Similar to the case of band attack detectors 158, 160 the underlying strong signals may be in-band or out-of-band. A band decay detector 162, 164 may be triggered if a peak or power level of the respective observed digital signal goes below a respective first/second band decay threshold value. Each of the band decay detectors 162, 164 may be configured to output a first/second band decay indicator to the AGC 166 indicating the detection a lowering peak or power level for the respective band detected by means of the respective band decay detector 162, 164.

Activation of the band attack detectors 158, 160 and band decay detectors 162, 164 can depend on the operation of the ADC attack detector 138 and ADC decay detector 139. This means, activation of the band attack detectors 158, 160 or the band decay detectors 162, 164 can rely on triggering of the ADC attack detector 138 or the ADC decay detector 139. Also, the band attack/decay thresholds may be adaptable according to triggering of the ADC attack/decay detectors 138, 139. Also, the band attack/decay threshold values may be related to the signal level at the chip input. In order to refer the thresholds back to the chip input, actual threshold used may depend on the current DSA setting.

Band attack detectors 158, 160 and band decay detectors 162, 164 may have a pass band larger than or equal to the external pass band provided by the external BWFs 116, 118. This ensures that the detectors 158, 160, 162, 164 observe the complete signal of their respective band. The bandwidth of the first and second branches 140, 141 output by the first and second pluralities of DDCs 142, 144, 146, 148 at the output sides thereof may be smaller than the external filter bandwidth and hence cannot represent the complete signal at the output of external BWFs 116, 118.

There is an automatic gain control (AGC) 166. The AGC 166 may receive indicator signals from the ADC attack detector 138 and the ADC decay detector 139. The AGC 166 may also receive indicator signals of the band attack detectors 158, 160 and the band decay detectors 162, 164. The AGC 166 may be configured to control the DSA 134 as well as the first/second AMPs 120, 122 with respect to their attenuation and gains. In particular, the control mechanism of the DSA 134 and the AMPs 120, 122 can be performed on an independent basis. In general, the control mechanism applied by the AGC 166 may be based on the indicator signals, meaning whether extrema or decays thereof are detected. This means, that if there is a trigger with respect to the first digital signal output from the BWF 154 detected by means of the first band attack detector 158, the AGC 166 may control the first AMP 120 and reduce the amplification. At the same time, the amplification by means of the second AMP 122 can be kept constant. Therefore, the AMPs 120, 122 may be controlled on an individual basis by means of the AGC 166 independent of each other.

In general, the AGC 166 may be configured such that the AMPs 120, 122 and the DSA 134 are operated at higher rather than at lower gains. Accordingly, the signal-to-noise ratio can be high.

The DSA 134, the ADC 136, the components at the output side of the ADC 136, and the AGC 166 are included in a single integrated circuit 170. In particular, the attack detector 138, the decay detector 139, the band attack detectors 158, 160 and the band decay detectors 162, 164 are programmable according to the respective needs.

Figure 2:
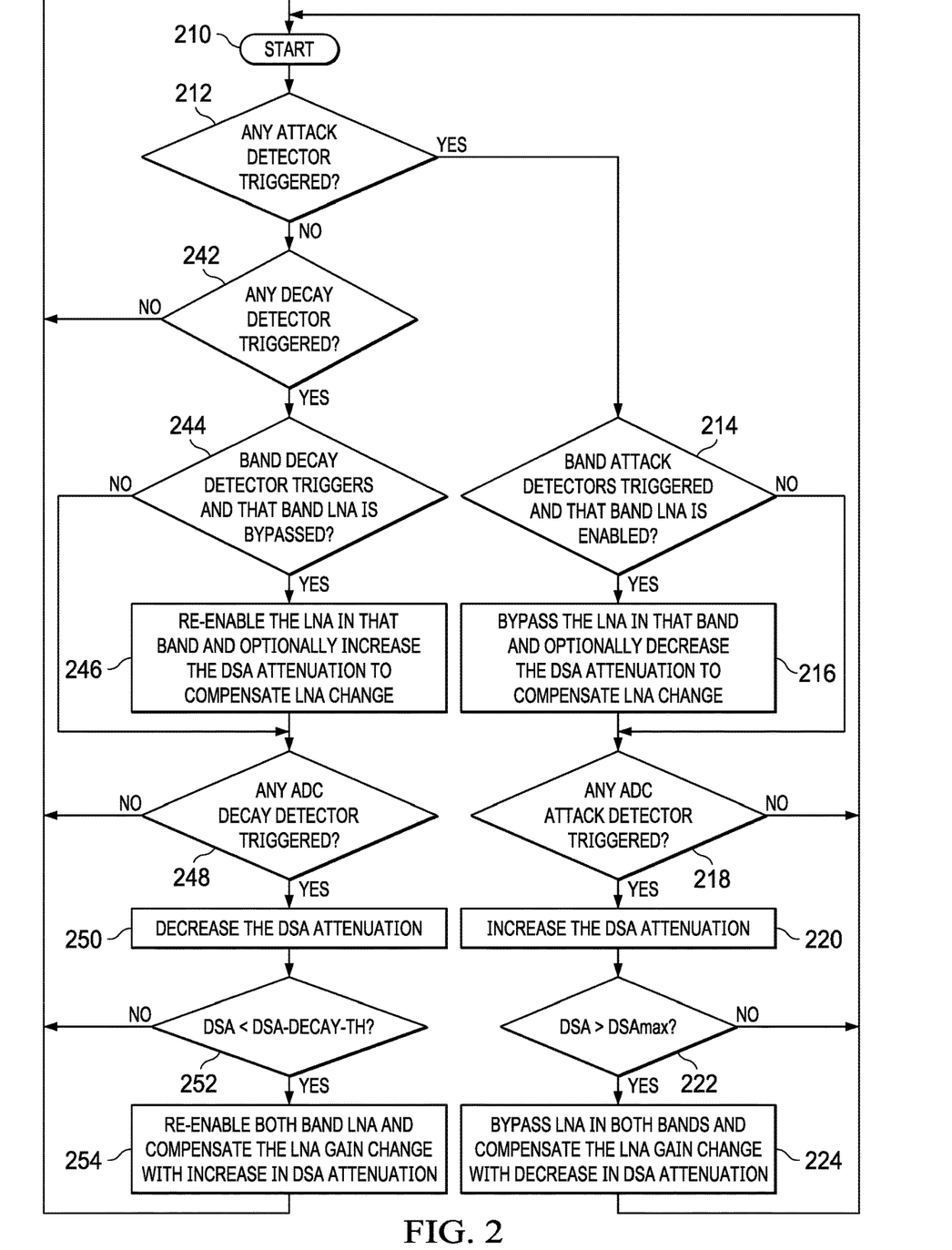
FIG. 2 is a flow diagram of the gain control mechanism.

FIG. 2 is a schematic drawing of the gain control mechanism 200 performed by the AGC 166. Subsequent to start 210 at step 212 any attack detector including ADC attack detector 138 and band attack detectors 158, 160 are checked.

If any of them is triggered, gain control moves to step 214. If none of them are triggered, gain control moves to step 242.

At step 214 band attack detectors 158,160 are monitored. Band attack detectors indicate peak or power level crossing a respective band attack threshold in a respective band. If band attack detector triggered and the corresponding AMP 120, 122 are not bypassed, gain control moves to step 216 otherwise it moves to step 218. At step 216 one of the amplification stages of the corresponding band AMP 120, 122 are bypassed. This is determined by the triggering of band attack detector. Moreover, at step 216 the attenuation by means of the DSA 134 is lowered in response to bypassing at least one amplification stage of at least one AMP 120, 122. Once completed gain control moves to state 218.

At step 218 gain control checks whether an ADC attack detector has triggered. If the ADC attack detector has triggered, gain control moves to step 220 otherwise gain control returns back to step 210. At step 220 gain control increases the DSA attenuation in response to the ADC attack detector being triggered and then moves to step 222.

At step 222 gain control determines whether the attenuation of the actual DSA 134 corresponding to DSA-CURRENT goes beyond a threshold value DSA-MAX. If this is true, gain control moves to step 224. Otherwise, the gain control returns to start 210.

At step 224 gain control bypasses one stage of both the AMPS 120, 122 if they are not bypassed earlier, and subsequently attenuation by means of the DSA 134 is lowered in response to bypassing the one amplification stage of both AMP 120, 122. After this step is completed, gain control returns to start 210.

At step 242 gain control checks whether any decay detector including ADC decay detector 139 and band decay detectors 162, 164 are triggered. If a decay detector is triggered, gain control moves to step 244 otherwise gain control returns to start 210.

At step 244 the band decay detectors 162, 164 are checked. If the band decay detectors 162, 164 are triggered (first or second or both) at step 244 and any amplification stage of the AMP or both AMPs 120, 122 is already bypassed in the band or bands for which the band decay detector(s) 162, 164 are triggered at step 244, gain control moves to step 246 otherwise gain control moves to step 248.

At step 246 the band AMP determined in step 244 is reactivated. Moreover, as the amplification of the analog input signal is increased again by re-activating an amplification stage, the attenuation, by means of the DSA 134, is increased as well. Subsequently, gain control moves to step 248.

At step 248 gain control determines whether the ADC decay detector 139 at the output of the ADC 136 is triggered. If the ADC decay detector 139 is not triggered at step 248, gain control returns to start 210 otherwise moves to step 250.

At step 250 the attenuation by means of the DSA 134 is decreased and gain control moves to step 252. Subsequently, at step 252 the gain control determines whether the attenuation of the actual DSA 134 corresponding to DSA-CURRENT goes below a threshold value DSA-DECAY-TH given by the difference of DSA-MAX and sum of LNA-GAIN and Gain Margin, i.e. whether DSA-CURRENT <DSA-DECAY-TH, wherein DSA-DECAY-TH=DSA-MAX−LNA-GAIN−GainMargin. If this is true, the gain control proceeds to step 254. Otherwise, the gain control returns to start 210.

At step 254 gain control re-actives one stage of both the AMPS 120, 122 if they are not enabled earlier and subsequently attenuation by means of the DSA 134 is increased in response to reactivating the one amplification stage of both AMP 120, 122. After this step is completed, gain control returns to start 210

Figure 3:
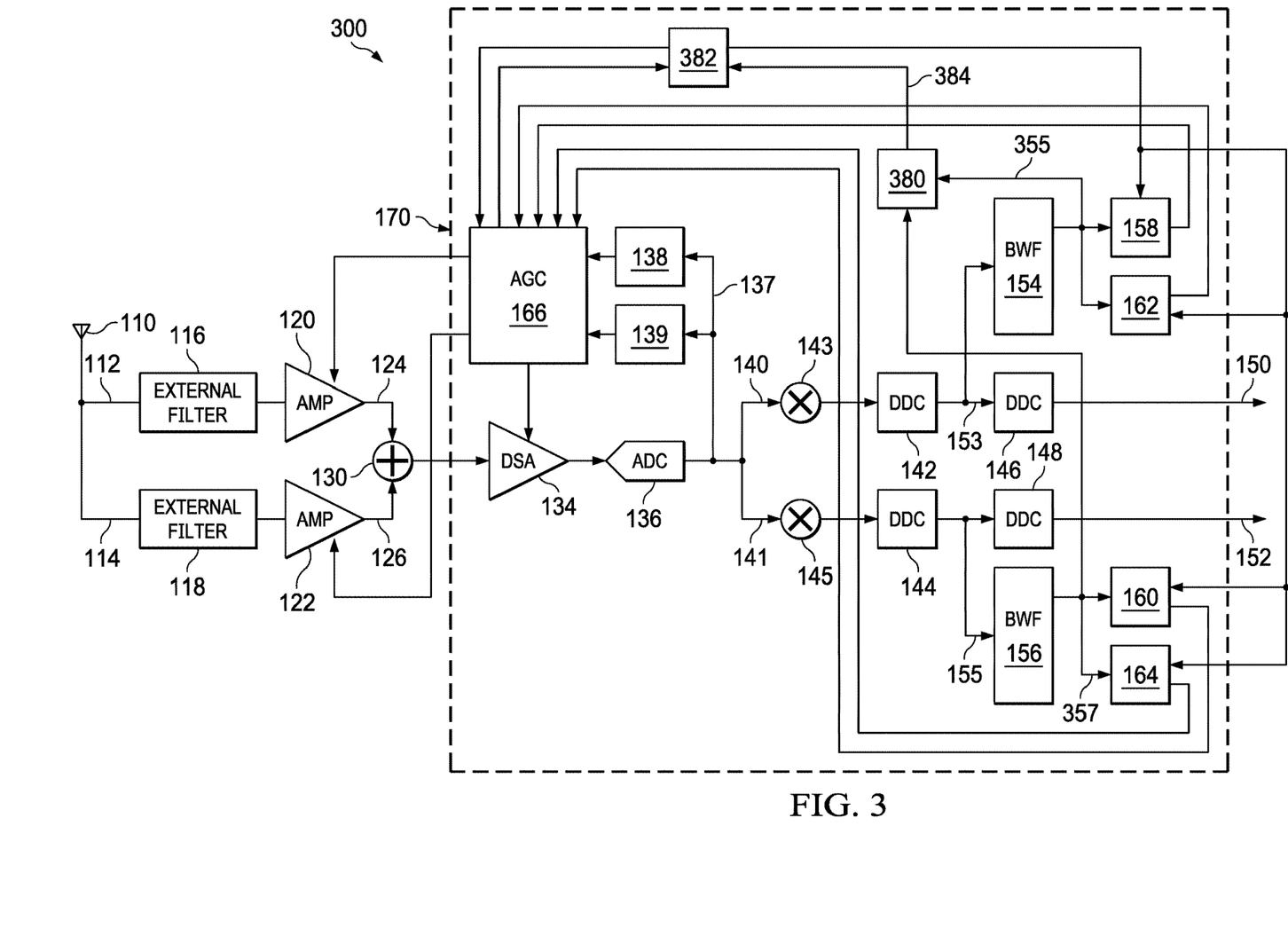
FIG. 3 is a simplified schematic diagram of another electronic device.

FIG. 3 is a simplified schematic diagram of another electronic device 300. The electronic device 300 is generally similar to electronic device 100 of an earlier embodiment. Therefore, description of similar components is omitted. However, electronic device 300 includes an additional band power difference circuit 380. The band power difference circuit 380 may be coupled to the band detector inputs 355, 357. The band power difference circuit 380 may compute the power or peak level of each band at the band detector inputs 355, 357. The band power difference circuit 380 can also be configured to include the current gains of the AMPs 120, 122 and the current DSA 134 gain state to obtain the band power or peak referred back to antenna. The power or peak level of each band may be referred back to the antenna or amplifier input by dividing by the current DSA Gain and current Amplifier Gain to obtain "FirstBandPowerAtAntenna" and "SecondBandPowerAtAntenna", respectively. Details have been explained herein before. The band power difference circuit 380 may also be configured to determine a peak/power level difference in decibels between the two antenna referred band powers. Furthermore, the band power difference circuit 380 may be coupled to a control element 382 which itself is coupled to the AGC 166 and band detectors 158, 160, 162 and 164.

The power or peak level detection stages may be configured to determine band peak or power level at the band detector inputs 355, 357. The band power level computed is referred back to the antenna by diving by the current DSA gain and current amplifier gain. Accordingly, power or peak levels detected by means of the level detection stages may be provided to the control element 382 without determining the difference of the power levels.

The control element 382 may be configured to provide a band power difference indicator or a level indicator to the AGC 166 and band detectors 158, 160, 162 and 164. The band power difference indicator may have different values depending on the value of the difference between both band peak or power levels as described herein before. The control element 382 may also be configured to adapt the different threshold values of the band power difference circuit 380. Based on the detected difference, the threshold values DSA-LNA-BYPASS, DECAY-TH-LNA, band attack and band decay threshold values can be adaptable by the control element 382. In an alternative, these threshold values may be adaptable based on the detected absolute power or peak levels detected by means of the level detection stages. The control element 382 can also be part of the AGC 166.

Accordingly, the AGC 166 may be configured to control the DSA 134 and/or the AMPs 120, 122 based on the difference between the peak or power levels detected by the band power difference circuit 380. For example, the AMPs 120, 122 may be individually controlled if it is found that that the peak/power level of one band is (significantly) increased over the peak/power level of the other band. The AMPs 120, 122 can also be controlled on an individual basis based on the absolute peak/power levels measured. In order to improve the overall signal-to-noise ratio for each band, the AMPs 120, 122 are generally operated in a specific operating range of their respective amplification. Due to the detection of the peak/power levels of the first and second bands, the operating states of the AMPs 120, 122 and the DSA 134 can be adapted independent of each other such that the overall signal-to-noise ratio is independently optimized in each band.

The threshold values DSA-LNA-BYPASS and DSA-DECAY-TH, band attack and band decay threshold values can depend on the peak/power levels detected by means of the band power difference circuit 380 or the level detection stages. The threshold values can also depend on the difference between these peak/power levels. For example, if only a small difference between the power levels is determined, DSA-LNA-BYPASS can be set to DSA-MAX or band attack and band decay threshold values can be set to higher values. In addition, DSA-DECAY-TH can be set to a high value TH-HIGH. In contrast, if a rather large difference between the power levels is determined, DSA-LNA-BYPASS can be set to DSA-PRECONF, wherein DSA-PRECONF<DSA-MAX or band attack and band decay thresholds can be set to lower values. In addition, DSA-DECAY-TH can then be set to a low value TH-LOW, wherein TH-LOW<TH-HIGH. DSA-LNA-BYPASS determines the peak level above which an AMP stage is bypassed, i.e. a band attack is triggered. DSA-DECAY-TH determines the peak level below which an AMP stage is re-enabled. Accordingly, the hysteresis on determining whether the peak/power level difference is small or large can be implemented by having two sets of power difference thresholds.

Figure 4:
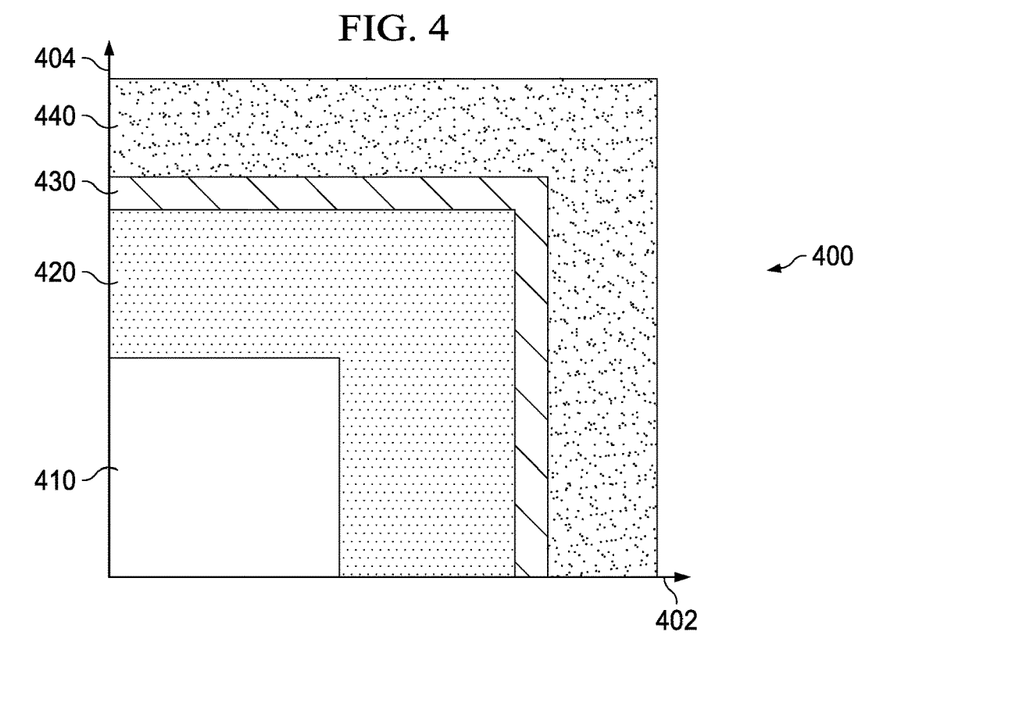
FIG. 4 is a schematic drawing of a gain state diagram according to the prior art.

FIG. 4 is a simplified schematic drawing of a gain state diagram 400 according to the prior art. The gain state diagram 400 shows on the first axis 402 the peak/power level of the first band prior to amplification by the first AMP (LNA) 120. On the second axis 404 the peak/power level of the second band prior to amplification by the second AMP (LNA) 122 is shown.

Within region 410 the band peak/power levels of both bands are so low, that both LNAs 120, 122 are enabled (meaning that all amplification stages of both LNAs are activated) and the operating range of the DSA 134 is not used.

Within region 420 the band peak/power levels of both bands are higher than in region 410. Accordingly, both LNAs 120, 122 are enabled and the operating range of the DSA 134 is used in addition. The DSA 134 is used in addition to adapt the peak/power level of the analog input signal prior to the ADC 136 according to an optimum power level. Thereby, the peak/power level is prevented from saturation and, simultaneously a suitable signal-to-noise ratio is achieved.

Region 430 represents the hysteresis region for the LNA state according to the band attack and band decay threshold values. If the peak/power level of one of the first and second bands exceeds region 430 in the direction of increasing levels towards region 440, at least one amplification stage of each of the LNAs 120, 122 is bypassed at region 440 in order to prevent the analog input signal from saturation. If the peak/power level of one of the first and second bands starting from region 440 goes below region 430 in the direction of decreasing levels towards region 420 (and if an amplification stage of each of the LNAs 120, 122 was bypassed before), this amplification stage is re-activated. However, according to the prior art there is no band-specific bypassing or activation of an amplification stage of the LNAs 120, 122. In the prior art, both LNAs are simultaneously treated similar to each other.

Figure 5:
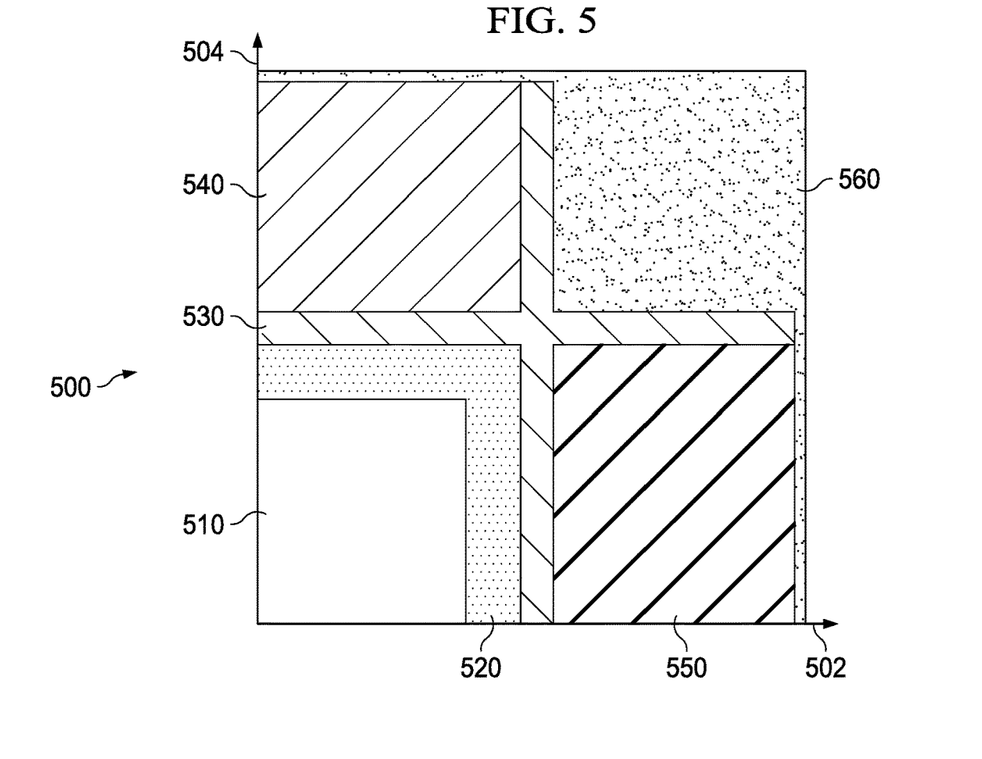
FIG. 5 is a schematic drawing of another gain state diagram.

FIG. 5 is a simplified schematic drawing of a gain state diagram 500 according to an embodiment. Similar to the previous gain state diagram 400, the axes 502, 504 of the gain state diagram 500 show the peak/power levels of the first and second band prior to amplification by the LNAs or referred back to the LNA inputs. Accordingly, detailed explanation is omitted here.

According to gain state diagram 500 the LNAs 120, 122 are controlled on an individual basis independent of each other. Region 510 represents the case that the band peak/power levels of both bands are so low, that both LNAs 120, 122 are enabled (all amplification stages of both LNAs are activated) and the operating range of the DSA is not used.

Within region 520 the band peak/power levels of both bands or one of the bands are higher such that the operating range of the DSA 134 is used in addition to adapt the peak/power level of the input analog signal.

Region 530 again represents a hysteresis for the LNA states, similar to region 430 of gain state diagram 400. However, bypassing an amplification stage of one of the LNAs 120 within regions 540 and 550 is performed on an individual basis. This means, that the amplification stage is only bypassed for the LNA 120 of that band, for which the peak/power level exceeds region 530. In contrast, the LNA 122 of the remaining band is not affected.

According to region 560 the peak/power levels of both bands exceeds region 530. Therefore, within region 560 at least one amplification stage of each of both LNAs 120, 122 is bypassed.

Re-activating the amplification stages if the peak/power level of any of the bands reduces and crosses region 530 toward region 520 is performed on an individual basis as well. The LNAs 120, 122 are treated independent of each other.

Gain state diagram 500 represents a case in which a strong signal is detected with regard to a single band only while the remaining band remains unaffected by the strong signal. Accordingly, for gain state diagram 500, the threshold values are DSA-LNA-BYPASS=DSA-PRECONF and DSA-DECAY-TH=TH-LOW, BAND_ATTACK_TH= BAND_ATTACK_TH_LOW, BAND_DECAY_TH= BAND_DECAY_TH_LOW.

Figure 6:
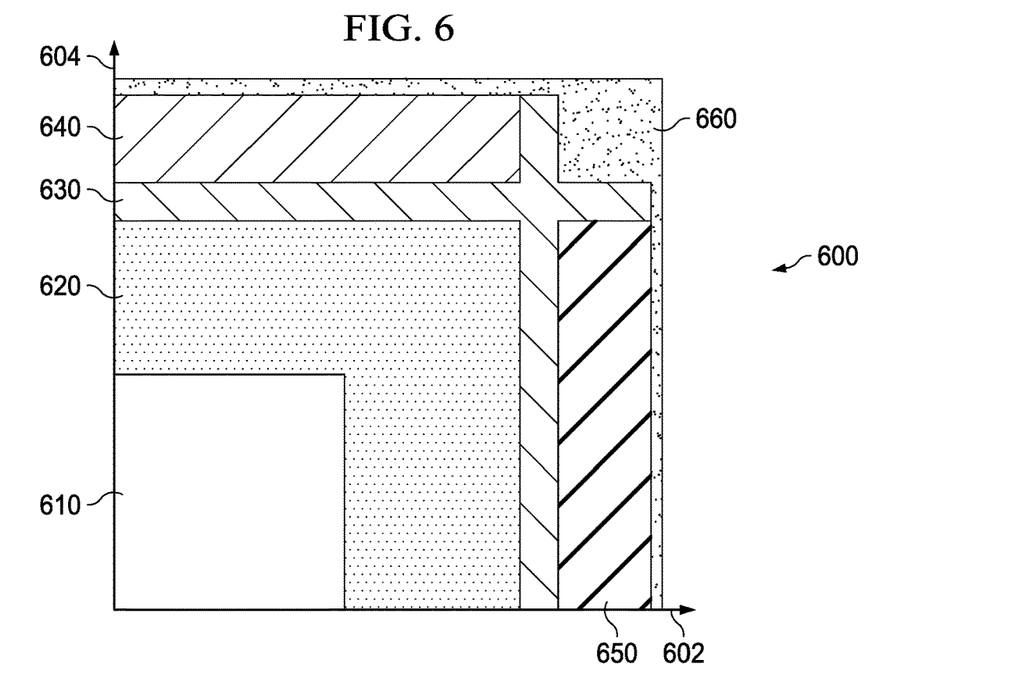
FIG. 6 is a schematic drawing of another gain state diagram.

FIG. 6 is a simplified schematic drawing of another gain state diagram 600. Similar to the previous gain state diagram 400, the axes 602, 604 of the gain state diagram 600 show the peak/power levels of the first and second band prior to amplification by the LNAs 120, 122. In principle, gain state diagram 600 is similar to gain state diagram 500. Accordingly, detailed explanation is omitted here.

Within region 610 both LNAs 120, 122 are enabled and the operating range of the DSA 134 is not used. Within region 620 the operating range of the DSA 134 is used in addition to the LNAs. Region 630 represents the region of hysteresis. Within region 640 the first LNA 120 is enabled while at least one amplification of the second LNA 122 is bypassed. Within region 650 at least one amplification stage of the first LNA 120 is bypassed while the second LNA 122 is enabled. Within region 660 at least one amplification stage of each of the LNAs is bypassed.

In contrast to gain state diagram 500, gain state diagram 600 represents a case in which a particular band's LNA is bypassed at a higher peak/power level. Since the LNA is only bypassed at a higher peak level in that band, the DSA attenuation is used up more in region 620 compared to region 520. Since the DSA range is used up more in region 620 and the DSA 134 is a common shared resource between both bands, both bands are affected by a strong signal in one band. In this case, both bands can be degraded equally to each other when the DSA 134 is used. Accordingly, the operating range of the DSA is set to maximum in order to provide a wide range region 620 in which the peak/power level of the analog input signal is appropriately adapted.

In case of the gain state diagram 600, the threshold values are DSA-LNA-BYPASS=DSA-MAX and DSA-DECAY-TH=TH-HIGH, BAND_ATTACK_TH=BAND_ATTACK_TH_HIGH, BAND_DECAY_TH=BAND_DECAY_TH_HIGH.

Since bypassing and re-activating the amplification stages of one band's LNAs is performed at a lower peak/power level in that band in 500 compared to 600, the overall signal-to-noise ratio is maintained high for the other band as the DSA 134 is not used much for attenuation.

Figure 7:
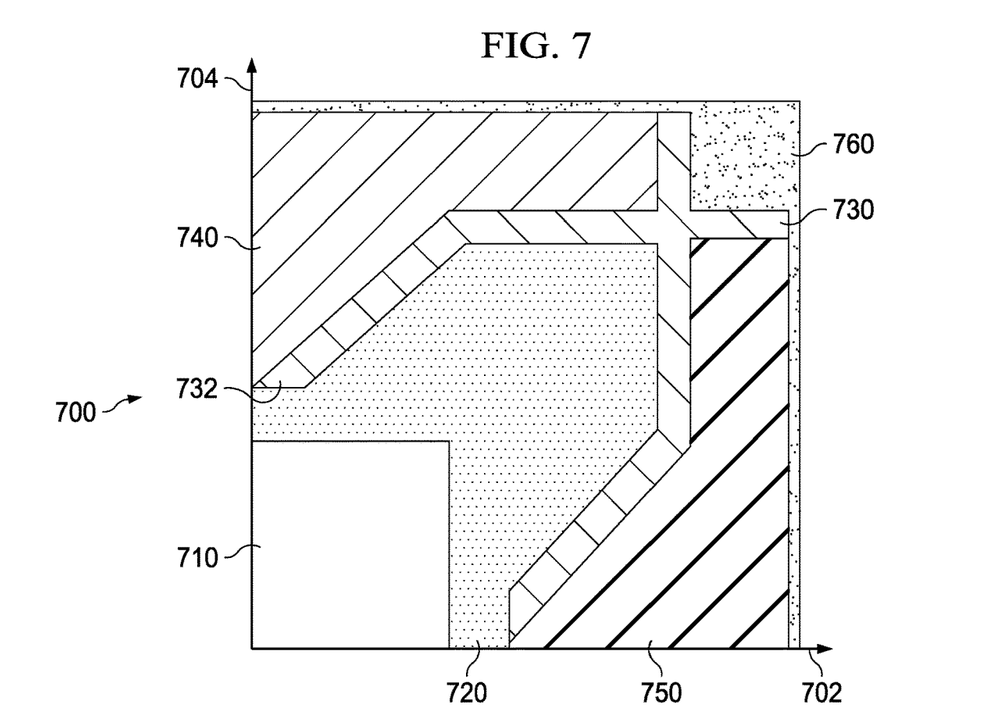
FIG. 7 is a schematic drawing of another gain state diagram.

FIG. 7 is a simplified schematic drawing of another gain state diagram 700. Similar to the previous gain state diagram 400, the axes 702, 704 of the gain state diagram 700 show the peak/power levels of the first and second band prior to amplification by the LNAs 120, 122. Accordingly, detailed explanation is omitted here.

Within region 710, both LNAs are enabled while the operating range of the DSA 134 is not used. Within region 720 the operating range of the DSA 134 is used whereas the LNAs 120, 122 are all enabled. Region 730 represents the region of hysteresis. Within region 740 the first LNA 120 is enabled while at least one amplification of the second LNA 122 is bypassed. Within region 750, at least one amplification stage of the first LNA 120 is bypassed while the second LNA 122 is enabled. Within region 760 at least one amplification stage of each of the LNAs 120, 122 is bypassed.

The gain state diagram 700 represents a configuration in which the gain state diagrams 500 and 600 are combined with each other to provide improved performance with regard to controlling the gain in the receiver chain prior to the ADC 136. On the one hand, a wide region 720 is provided in which the operating range of the DSA 134 is used in addition to the LNAs 120, 122. On the other hand, region 760, in which at least one amplification stage of both LNAs 120, 122 is bypassed is smaller compared to gain state diagram 500.

As gain state diagram 700 combines both configurations of gain state diagrams 500 and 600, region 730 of the hysteresis does not reach the axes 702, 704 in a similar manner as is the case for gain state diagrams 500, 600. The reason is that an additional hysteresis occurs due to the switching between the configurations according to gain state diagrams 500, 600, i.e. between TH-HIGH and TH-LOW. The switching between the two configurations is based on the band power difference indicator. If the band power difference is lower, gain state diagram 600 is used whereas if the band power difference is higher, gain state diagram 500 is used.

Accordingly, bypassing and re-activating amplification stages of the LNAs 120, 122 is performed only if needed according to the signal level within the respective band. Therefore, the signal-to-noise ratio can be optimized especially for the case that an extremum is detected only with regard to one band while the signal level of the other band is low.

Figure 8:
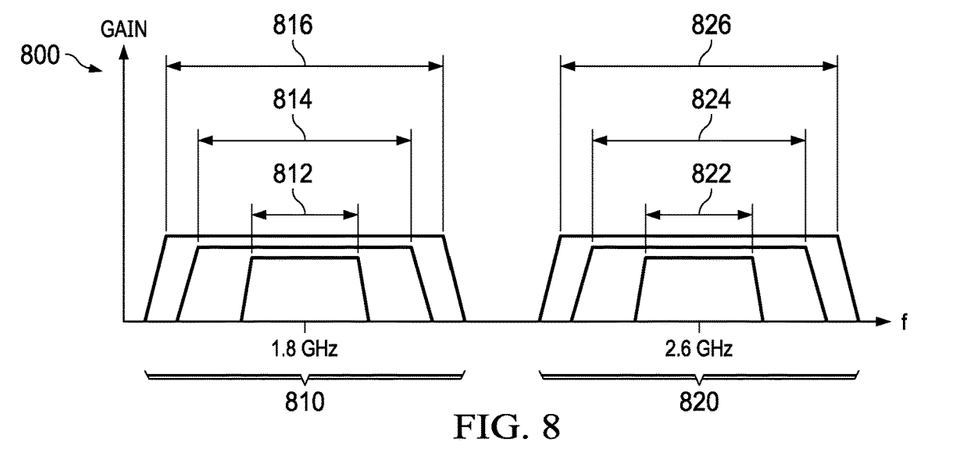
FIG. 8 is a schematic drawing of the band-dependent pass bands.

FIG. 8 is a simplified schematic drawing of the band-dependent pass bands. The embodiment 800 shows a first band 810 according to a first frequency range and a second band 820 according to a second frequency range. In case of the first band 810, a narrow frequency range represents the output pass band 812 of the integrated circuit at the first output 150. In this example, the center frequency is 1.8 GHz. The output pass band 812, having a bandwidth of 100 Mhz, is encompassed by a wider frequency range, 150 MHz, representing the external pass band 814 provided by the additional BWF 116 at an input side of the first AMP 120. An even wider frequency range, 200 MHz, represents the pass band 816 provided at an output side of the first BWF 154 prior to the first band attack 158 and decay 162 detectors.

In case of the second band 820, a narrow frequency range represents the output pass band 822 of the integrated circuit at the second output 152. In this example, the center frequency is 2.6 GHz. The output pass band 822, having a bandwidth of 100 Mhz, is encompassed by a wider frequency range, 150 Mhz, representing the external pass band 824 provided by the additional BWF 118 at an input side of the second AMP 122. An even wider frequency range, 200 MHz, represents the pass band 826 provided at an output side of the second BWF 156 prior to the second band attack 160 and decay 164 detectors. Since the latter pass band 826 encompasses pass band 824, the second band attack 160 and decay 164 detectors will observe all strong signals input to the second AMP 122.

The pass bands of the first band 810 do not comprise any overlap with the pass bands of the second band 820. Hence, the detection may be independently performed.

Figure 9:
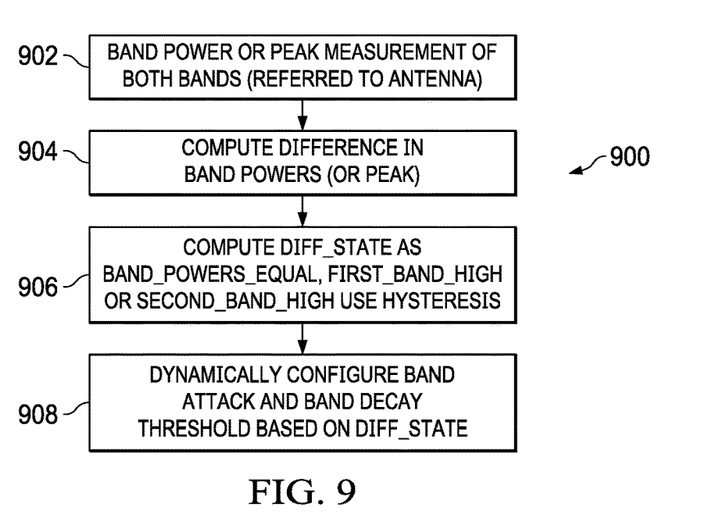
FIG. 9 is a schematic drawing of part of the control mechanism performed by the AGC based on the difference in band powers.

FIG. 9 is a simplified schematic drawing 900 of the control mechanism performed by the AGC 166 relating to the specifics of the band power difference circuit 380.

At step 902 the peak or power levels of the digital signals at the output sides of the first and second BWFs 154 and 156 may be measured for the first and the second band respectively and referred back to the peak or power levels at the antenna 110 at an input of the circuit.

At step 904 the difference between the peak or power levels of the first and second bands may be computed by the band power difference circuit 380.

At step 906 a difference stage indicator 384 may be determined based on the difference calculated at step 904. This means, if the difference between the peak or power levels referred back to the antenna is below a difference threshold value, the difference stage indicator may be referred to as "BAND_POWERS_EQUAL". If the difference is larger than the difference threshold value or smaller than the negative difference threshold value, the difference stage indicator may be referred to as "FIRST_BAND_HIGH" or "SECOND_BAND_HIGH", respectively. In addition, a hysteresis may be applied between the different conditions so as to avoid toggling between those different states.

At step 908 the AGC 166 may be configured to adapt the threshold values for the band attack 158 and 160, and decay 162 and 164 detectors based on the value of the difference stage indicator 384. In general, the threshold values may be rather high if the difference stage indicator is in state "BAND_POWERS_EQUAL". Elsewise, the threshold values for the respective band may be adapted to a lower value as has been described herein before.

Figure 10:
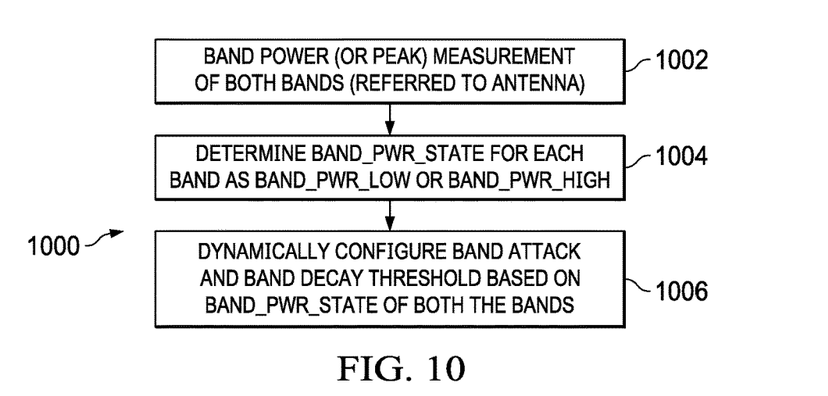
FIG. 10 is a schematic drawing of part of the control mechanism performed by the AGC based on the detected band powers.

FIG. 10 is a simplified schematic drawing of part 1000 of the control mechanism performed by the AGC 166 based on the detected band peaks.

At step 1002 the peak or power levels of the digital signals at the output sides of the first and second BWFs 154 and 156 may be measured for the first and the second band and respectively referred back to the peak or power levels at the antenna 110 at an input of the circuit.

At step 1004 the absolute peak or power level (amplitude) may be determined for the first and second band, respectively. This may be performed by means of peak or power level detection stages 158, 160, 162 and 164.

At step 1006 the AGC 166 may be configured to adapt the threshold values for the band attack and decay detectors 158, 160, 162 and 164 based on the absolute peak or power levels determined at step 1004. In general, the threshold values may be rather high if the peak or power levels are similar to each other. Elsewise, the threshold values for the respective band may be adapted to a lower value as has been described herein before.

Although the integrated circuit and the electronic device have been described hereinabove with reference to specific embodiments, they are not limited to these embodiments and no doubt further alternatives will occur to the skilled person that lie within the scope as claimed.

The invention claimed is:

1. A circuit comprising:
   an input terminal;
   a first output terminal;
   a second output terminal;
   a digital step attenuator having a first input, a second input and an output wherein the first input is coupled to the input terminal;
   an analog-to-digital converter having an input and an output wherein the input is coupled to the output of the digital step attenuator;
   a first bandwidth filter having an input and an output wherein the input is coupled to the output of the analog-to-digital converter;
   a first band attack detector having an input and an output wherein the input is coupled to the output of the first bandwidth filter;
   a first band decay detector having an input and an output wherein the input is coupled to the output of the first bandwidth filter;
   a second bandwidth filter having an input and an output wherein the input is coupled to the output of the analog-to-digital converter;
   a second band attack detector having an input and an output wherein the input is coupled to the output of the second bandwidth filter;
   a second band decay detector having an input and an output wherein the input is coupled to the output of the second bandwidth filter;
   an analog-to-digital attack detector having an input and an output, the input coupled to the output of the analog-to-digital converter;
   an analog-to-digital decay detector having an input and an output, the input coupled to the output of the the analog-to-digital converter; and
   an automatic gain control circuit having a first input, a second input, a third input, a fourth input, a fifth input, a sixth input and an output wherein the first input is coupled to the output of the first band attack detector, the second input is coupled to the output of the first band decay detector, the third input is coupled to the output of the second band attack detector, the fourth input is coupled to the output of the second band decay detector, the fifth input is coupled to the output of the analog-to-digital attack detector, and the sixth input coupled to the output of the analog-to-digital decay detector and the output is coupled to the second input of the a digital step attenuator.

2. The circuit of claim 1, wherein the analog-to-digital converter is configured to output a digital signal having a first frequency range and a second frequency range.

3. The circuit of claim 1, wherein the first bandwidth filter is configured to extract a digital signal having a first frequency range output by the analog-to-digital converter.

4. The circuit of claim 1, wherein the second bandwidth filter is configured to extract a digital signal having a second frequency range output by the analog-to-digital converter.

5. The circuit of claim 1, wherein at least one of the first band attack detector and the first band decay detector is configured to detect a band peak or a decay thereof associated with a first frequency range and to provide at least a first band attack indicator or a first band decay indicator to the automatic gain control circuit.

6. The circuit of claim 1, wherein at least one of the second band attack detector and the second band decay detector is configured to detect a band peak or a decay thereof associated with a second frequency range and to provide at least a second band attack indicator or a second band decay indicator to the automatic gain control circuit.

7. The circuit of claim 5, wherein the first band attack indicator is based on the detection of a band peak associated with the first frequency range and the first band decay indicator is based on the detection of the decay of the band peak associated with the first frequency range.

8. The circuit of claim 6, wherein the second band attack indicator is based on the detection of a band peak associated with the second frequency range and the second band decay indicator is based on the detection of the decay of the band peak associated with the second frequency range.

9. The circuit of claim 1, wherein a first frequency range and a second frequency range do not overlap each other.

10. The circuit of claim 1, wherein the automatic gain control circuit is configured to control at least the digital step attenuator based at least on a first and a second band attack indicator, and a first and a second band decay indicator.

11. The circuit of claim 1, wherein a first amplifier provides a first analog signal to the input terminal, and a second amplifier provides a second analog signal to the input terminal, and wherein the automatic gain control circuit is configured to control the first amplifier and the second amplifier independent of each other based at least on a first and a second band attack indicator and a first and a second band decay indicator.

12. The circuit of claim 1, wherein each of the first and second band attack detectors is configured to detect a band peak associated with a respective frequency range when an amplitude of the band peak of the digital signal exceeds a respective first predetermined threshold value, wherein the first threshold value is dynamically adjusted based on at least an attenuation of gain by the digital step attenuator.

13. The circuit of claim 1, wherein each of the first and second band decay detectors is configured to detect an attenuation of a band peak associated with a respective frequency range when an amplitude of the band peak of the digital signal goes below a respective second predetermined threshold value, wherein the second threshold value is dynamically adjusted based on at least an attenuation of gain by the digital step attenuator.

14. The circuit of claim 1 further comprising a first mixer having an input and an output, the input of the first mixer coupled to the output of the analog-to-digital converter;
   a first digital-down-converter having an input and an output, the input of the first digital-down-converter coupled to the output of the first mixer and the output of the first digital-down-converter coupled to the input of the first bandwidth filter; and
   a second digital-down-converter having an input and an output, the input of the second digital-down-converter coupled to the output of the first digital-down-converter and the output of the second digital-down-converter coupled to the first output terminal.

15. The circuit of claim 1 further comprising a second mixer having an input and an output, the input of the second mixer coupled to the output of the analog-to-digital converter;
- a third digital-down-converter having an input and an output, the input of the third digital-down-converter coupled to the output of the second mixer and the output of the third digital-down-converter coupled to the input of the second bandwidth filter; and
- a fourth digital-down-converter having an input and an output, the input of the fourth digital-down-converter coupled to the output of the third digital-down-converter and the output of the fourth digital-down-converter coupled to the second output terminal.

16. The circuit of claim 1, wherein the first output terminal is configured to provide a first digital signal with a first frequency range and the second output terminal is configured to provide a second digital signal with a second frequency range; and
- wherein the output of the first bandwidth filter is configured to provide a third digital signal with a third frequency range and wherein the output of the second bandwidth filter is configured to provide a fourth digital signal with a fourth frequency range.

17. The circuit of claim 16, wherein the second frequency range is greater than the first frequency range.

18. The circuit of claim 16, wherein the third frequency range is greater than the first frequency range and the four frequency range is greater than the second frequency range.

19. A method of operating a receiver, wherein the method comprises:
- receiving, at an input coupled to a digital step attenuator (DSA), an analog signal;
- attenuating the analog signal by means of the DSA and providing the attenuated signal to an analog-to-digital converter (ADC);
- converting the analog signal into a digital signal by means of the ADC and outputting the digital signal including a first frequency range and a second frequency range at an output of the ADC;
- applying a first bandwidth filter (BWF) to the digital signal outputted by the ADC, wherein the first bandwidth filter is configured to extract a digital signal having the first frequency range from the digital signal outputted by the analog-to-digital converter and to provide the digital signal to a first band attack detector, and a first band decay detector detecting a band peak or a decay thereof associated with the first frequency range by means of the first band attack detector and the first band decay detector;
- providing at least a first band attack indicator or a first band decay indicator to an automatic gain control (AGC) by means of the first band attack detector and the first band decay detector, the first band attack indicator being based on the detection of the band peak associated with the first frequency range, the first band decay indicator being based on the detection of the decay of the band peak associated with the first frequency range;
- applying a second BWF to the digital signal outputted by the ADC, wherein the second BWF is configured to extract a digital signal having the second frequency range from the digital signal outputted by the ADC and to provide the digital signal to a second band attack detector and a second band decay detector;
- detecting a band peak or a decay thereof associated with the second frequency range by means of the second band attack detector and the second band decay detector;
- providing at least a second band attack indicator or a second band decay indicator to the AGC by means of the second band attack detector and the second band decay detector, the second band attack indicator being based on the detection of the band peak associated with the second frequency range, the second band decay indicator being based on the detection of the decay of the band peak associated with the second frequency range, the first BWF, the first band attack detector, and the first band decay detector being independent of any of the second BWF, the second band attack detector, and the second band decay detector; and
- controlling by means of the AGC at least the DSA based at least on the first and second band attack indicators and first and second band decay indicators.

20. The method of claim 19 further comprising:
- determining dynamically the first and second band attack indicators, and first and second band decay indicators by determining a difference in power between the first frequency range and the second frequency range.

21. The method of claim 19 further comprising:
- controlling by means of the AGC an amplitude of the analog signal.

* * * * *